(12) United States Patent
Chen et al.

(10) Patent No.: US 12,013,804 B2
(45) Date of Patent: Jun. 18, 2024

(54) INTEGRATED CIRCUIT, DATA PROCESSING DEVICE AND METHOD

(71) Applicant: Lemon Inc., Grand Cayman (KY)

(72) Inventors: Yimin Chen, Los Angeles, CA (US); Shan Lu, Los Angeles, CA (US); Junmou Zhang, Los Angeles, CA (US); Chuang Zhang, Los Angeles, CA (US); Yuanlin Cheng, Beijing (CN); Jian Wang, Beijing (CN)

(73) Assignee: Lemon Inc., Grand Cayman (KY)

( * ) Notice: Subject to any disclaimer, the term of this patent is extended or adjusted under 35 U.S.C. 154(b) by 89 days.

(21) Appl. No.: 17/737,527

(22) Filed: May 5, 2022

(65) Prior Publication Data

US 2022/0358078 A1 Nov. 10, 2022

(30) Foreign Application Priority Data

May 7, 2021 (CN) .......................... 202110496101.2

(51) Int. Cl.
*G06F 13/42* (2006.01)
*G06F 9/30* (2018.01)
*G06F 13/40* (2006.01)
*G06F 15/173* (2006.01)

(52) U.S. Cl.
CPC ...... *G06F 13/4282* (2013.01); *G06F 9/30047* (2013.01); *G06F 13/4068* (2013.01); *G06F 15/17368* (2013.01)

(58) Field of Classification Search
None
See application file for complete search history.

(56) References Cited

U.S. PATENT DOCUMENTS

| 7,827,383 | B2* | 11/2010 | Spracklen | ........... G06F 12/1036 |
| | | | | 712/34 |
| 8,447,957 | B1* | 5/2013 | Carrillo | ............... G06F 13/1684 |
| | | | | 712/225 |
| 2018/0107489 | A1* | 4/2018 | Gao | .................... G06F 9/30174 |
| 2018/0284996 | A1* | 10/2018 | Guim Bernat | ........ G06F 3/0605 |
| 2018/0293205 | A1 | 10/2018 | Koker et al. | |
| 2019/0297015 | A1* | 9/2019 | Marolia | ................ H04L 45/742 |
| 2019/0354409 | A1 | 11/2019 | Belmar et al. | |
| 2020/0218684 | A1 | 7/2020 | Sen et al. | |

FOREIGN PATENT DOCUMENTS

| CN | 109426549 A | 3/2019 |
| CN | 109558168 A | 4/2019 |
| CN | 110958189 A | 4/2020 |
| TW | 201535253 | 9/2015 |
| TW | 201535253 A | 9/2015 |

* cited by examiner

*Primary Examiner* — Henry Tsai
*Assistant Examiner* — Dean Phan
(74) *Attorney, Agent, or Firm* — Faegre Drinker Biddle & Reath LLP

(57) ABSTRACT

An integrated circuit, and a data processing device and method are provided. The integrated circuit includes a processor circuit and an accelerator circuit. The processor circuit includes a processor, a first data storage section, and a first data input/output interface. The accelerator circuit includes an accelerator and a second data input/output interface. The second data input/output interface is electrically connected to the first data input/output interface, so that the accelerator circuit can perform information interaction with the first data storage section.

18 Claims, 3 Drawing Sheets

INTEGRATED CIRCUIT, DATA PROCESSING DEVICE AND METHOD

The present application claims priority to Chinese Patent Application No. 202110496101.2, titled "INTEGRATED CIRCUIT, DATA PROCESSING DEVICE AND METHOD", filed on May 7, 2021 with the China National Intellectual Property Administration, which is incorporated herein by reference in its entirety.

FIELD

The present disclosure relates to the field of integrated circuits, and in particular to an integrated circuit, a data processing device and a data processing method.

BACKGROUND

A general-purpose processor (for example, a central processing unit (CPU)) may be provided with an accelerator in order to improve capability of data processing of the general-purpose processor. The accelerator is configured to process data, such as encode and decode an image, and process data between layers of a neural network model.

SUMMARY

This summary is provided to introduce concepts in a simplified form that are described in detail in the detailed description that follows. This summary is neither intended to identify key or essential features of the claimed technical solutions, nor intended to limit the scope of the claimed technical solutions.

An integrated circuit, a data processing device and a data processing method are provided according to embodiments of the present disclosure.

In a first aspect, an integrated circuit is provided according to an embodiment of the present disclosure. The integrated circuit includes a processor circuit and an accelerator circuit. The processor circuit includes a processor, a first data storage section, and a first data input/output interface. The accelerator circuit includes an accelerator and a second data input/output interface. The second data input/output interface is electrically connected to the first data input/output interface, so that the accelerator circuit performs information interaction with the first data storage section.

In a second aspect, a data processing device is provided according to an embodiment of the present disclosure. The data processing device includes the integrated circuit as described in the first aspect. The integrated circuit includes a processor circuit and an accelerator circuit. The processor circuit includes a processor, a first data storage section, and a first data input/output interface. The accelerator circuit includes an accelerator and a second data input/output interface. The second data input/output interface is electrically connected to the first data input/output interface, so that the accelerator circuit performs information interaction with the first data storage section.

In a third aspect, a data processing method is provided according to an embodiment of the present disclosure. The method is applied to the integrated circuit as described in the first aspect. The method includes: determining, by a processor circuit in response to receipt of a data processing request, address data corresponding to the data processing request; and sending, by the processor circuit in response to receipt of the data processing request, the address data to an accelerator circuit; acquiring, by the accelerator circuit based on the address data, to-be-processed data corresponding to a to-be-processed request from a first data storage section in the processor circuit; and sending, by the accelerator circuit, a processing result of the to-be-processed data to the processor circuit through a connection between a first data input/output interface and a second data input/output interface.

BRIEF DESCRIPTION OF THE DRAWINGS

The above and other features, advantages and aspects of embodiments of the present disclosure will become apparent in conjunction with the drawings and with reference to the following detailed description. Throughout the drawings, the same or similar reference numbers refer to the same or similar elements. It should be understood that the drawings are illustrative and that the components and elements are unnecessarily drawn to scale.

DETAILED DESCRIPTION

Figure 1:
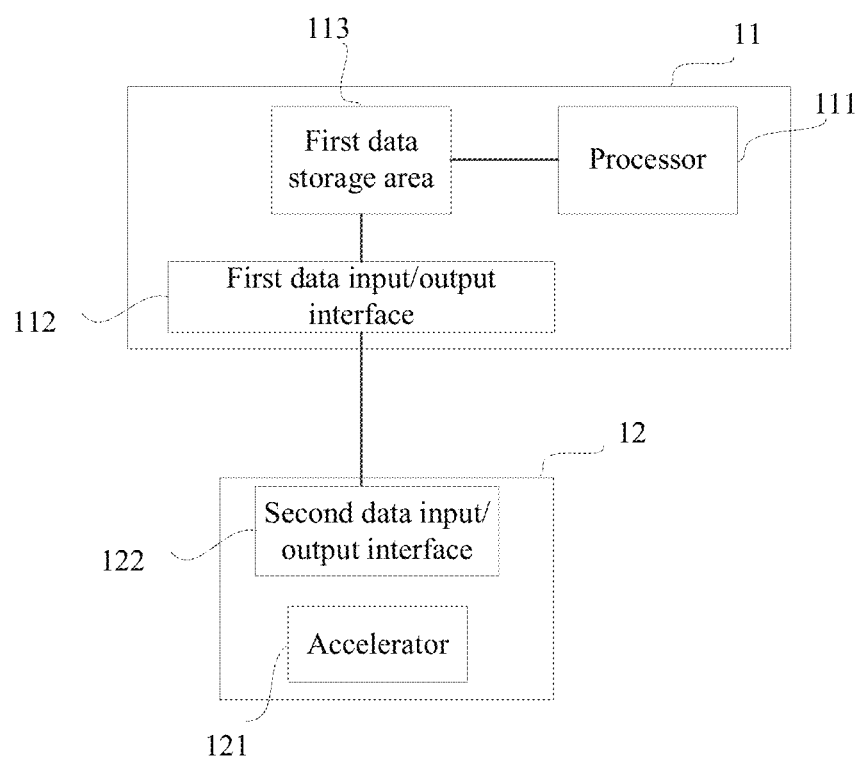
FIG. 1 is a schematic structural diagram illustrating an integrated circuit according to some embodiments of the present disclosure.

Embodiments of the present disclosure are described in more detail below with reference to the drawings. Although certain embodiments of the present disclosure are shown in the drawings, it should be understood that the present disclosure may be embodied in various forms and should not be construed as limited to the embodiments set forth herein. Instead, these embodiments are provided for a thorough and complete understanding of the present disclosure. It should be understood that the drawings and embodiments of the present disclosure are only for illustrative purposes, and are not intended to limit the protection scope of the present disclosure.

It should be understood that the steps described in the method embodiments of the present disclosure may be performed in a different order and/or in parallel. Furthermore, method embodiments may include an additional step and/or an illustrated step may not be performed. The scope of the present disclosure is not limited in this regard.

The term "including" and variations thereof herein are open-ended inclusions, that is, "including but not limited to". The term "based on" indicates "based at least in part on." The term "one embodiment" indicates "at least one embodiment". The term "another embodiment" indicates "at least one additional embodiment". The term "some embodiments" indicates "at least some embodiments". Definitions of other terms are given in the description below.

It should be noted that terms such as "first" and "second" in the present disclosure are only for distinguishing one device, module or unit from another, and are not to limit the order or interdependence of functions performed by these devices, modules or units.

It should be noted that quantifiers such as "a" and "a plurality of" in the present disclosure are illustrative rather than restrictive. It should be understood by those skilled in the art that unless the context clearly dictates otherwise, "a" and "a plurality of" each should be construed as "one or more".

The name of a message or information exchanged between devices in the embodiments of the present disclosure is only for illustrative purposes and is not intended to limit the scope of the message or information.

Reference is made to FIG. 1, which is a schematic structural diagram illustrating an integrated circuit according to some embodiments of the present disclosure.

As shown in FIG. 1, the integrated circuit includes a processor circuit 11 and an accelerator circuit 12. The processor circuit 11 includes a processor 111, a first data storage section 113 and a first data input/output interface 112. The processor 111 is connected to the first data storage section 113 via a first bus arranged in the processor circuit 11.

The accelerator circuit 12 includes an accelerator 121 and a second data input/output interface 122. The second data input/output interface 122 is electrically connected to the first data input/output interface 112.

A connection line is arranged between the second data input/output interface 122 and the first data input/output interface 112 in order to electrically connect the second data input/output interface 122 to the first data input/output interface 112, and data is transmitted through the connection line. In addition, a serial communication module or a parallel communication module may be arranged between the second data input/output interface and the first data input/output interface.

The serial communication module herein may be, for example, a Serdes lane. The Serdes lane convert a multi-channel low-speed parallel signal of a transmitting end (that is, the accelerator circuit or processor circuit) into a high-speed serial signal. The high-speed serial signal passes through the connection line and then is converted into a low-speed parallel signal at the receiving end (that is, the processor circuit or accelerator circuit). This point-to-point serial communication technology can make full use of channel capacity of the connection line, reduce the number of transmission channels and device pins, and improve the transmission speed of signals, thereby greatly reducing communication costs.

The above parallel communication module may include a set of parallel connection lines, which transmit signals received from the transmitting end to the receiving end in parallel.

The processor herein may be a general-purpose processor (that is, a central processing unit, CPU), a graphics processor or the like. The general-purpose processor may access the data storage section via the first bus.

The first data storage section 113 may include a cache, a dynamic random-access memory (DRAM), and a static random-access memory (SRAM).

The first data storage section 113 may correspond to an address. The processor 111 and the accelerator 121 each store data into the first data storage section 113 or read data from the first data storage section 113 based on the address.

The first data storage section 113 may store a data processing result obtained by the accelerator 121 processing data, or cache to-be-processed data.

The accelerator 121 may be configured to process special-purpose data, such as image data, or a large amount of intermediate data. Therefore, the amount of data calculated by the accelerator is relatively large. In addition, the data amount of the calculation result of the accelerator 121 is relatively large.

In a case that an accelerator dedicated for data processing is added in the integrated circuit where the processor is arranged, the accelerator shares the first bus of the processor in order to improve data processing capability of the integrated circuit. However, since the accelerator and the processor share the first bus, the accelerator is still restricted by the first bus. Further, since an on-chip bandwidth occupied by the accelerator is larger, congestion of data transmission easily occurs, resulting in a problem in the quality of service. In addition, arranging an accelerator in the processor circuit increases the complexity of manufacturing the processor circuit, resulting in a reduction in the yield of the processor circuit.

In this embodiment, the accelerator circuit is arranged outside the processor circuit, and the accelerator circuit performs data interaction with the processor circuit through the second data input/output interface in the accelerator circuit and the first data input/output interface in the processor circuit. On the one hand, the accelerator, when accessing the first data storage section in the processor circuit, is not restricted by the bus in the processor core. On the other hand, the accelerator, when accessing the first data storage section, does not affect the processor too much, thereby lowering congestion on the bus in the processor and improving the quality of service (QoS) of an application. In addition, compared with the solution of arranging the accelerator inside the processor circuit, arranging the accelerator circuit outside the processor circuit can simplify the process of manufacturing the processor circuit and increase the yield of the processor circuit.

In some optional implementations of this embodiment, a second data storage section may be arranged in the accelerator circuit 12. The second data storage section may include, for example, a static random-access memory (SRAM). The second data storage section may store to-be-processed data and an intermediate processing result. Data interaction between the accelerator and the second data storage section does not affect the data channel of the processor circuit, thereby further lowering the congestion on the bus in the processor and further improving the quality of service of the application.

Figure 2:
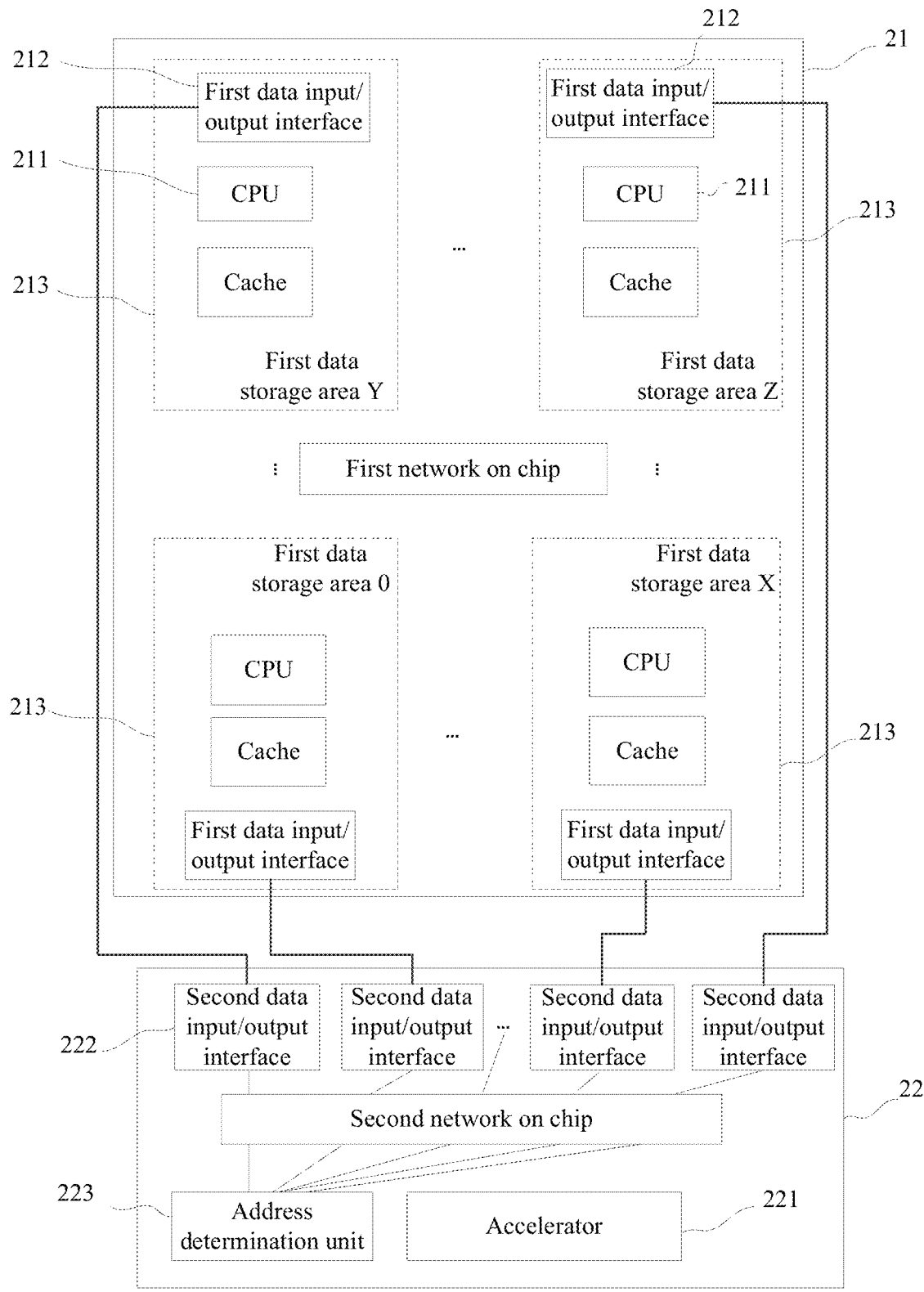
FIG. 2 is a schematic structural diagram illustrating an integrated circuit according to other embodiments of the present disclosure.

Reference is made to FIG. 2, which is a schematic structural diagram illustrating an integrated circuit according to other embodiments of the present disclosure. Like the embodiment shown in FIG. 1, the integrated circuit shown in FIG. 2 includes a processor circuit 21 and an accelerator circuit 22. The processor circuit 21 includes a processor 211 and a first data storage section 213, and the processor 211 is connected to the first data storage section 213 via a first bus arranged in the processor circuit 21. The processor circuit 21 further includes a first data input/output interface 212. The accelerator circuit 22 includes an accelerator 221 and a second data input/output interface 222.

Different from the embodiment shown in FIG. 1, the accelerator circuit in this embodiment shown in FIG. 2 includes multiple second data input/output interfaces.

The processor circuit 21 includes the processor 211, multiple first data input/output interfaces 212 and multiple first data storage sections 213. The multiple first data storage sections 213 are in one-to-one correspondence with the multiple first data input/output interfaces 212. As shown in FIG. 2, the processor circuit 21 may include a data storage section 0, . . . , a data storage section X, a data storage section Y, and a data storage section Z.

The multiple first data input/output interfaces 212 are in one-to-one correspondence with the multiple second data input/output interfaces 222. A second data input/output interface 222 is electrically connected to its corresponding first data input/output interface 212.

The multiple first data storage sections are in one-to-one correspondence with the multiple first data input/output interfaces 212. That is, the first data storage section performs information interaction with the accelerator through the first data input/output interface.

The electrical connection between the second data input/output interface 222 and its corresponding first data input/output interface 212 may be the same as the electrical connection between the second data input/output interface and the first data input/output interface in the embodiment shown in FIG. 1.

The multiple first data storage sections each correspond to a first identifier. The first identifier may include a number, a character and the like represented by binary codes. Optionally, the first identifier may be a serial number of the first data storage section represented by the number and the character. The processor 211 or the accelerator 221 may access the first data storage section based on the first identifier corresponding to the first data storage section.

It should be noted that the first data storage section may include data storage units such as a cache, a dynamic random-access memory (DRAM), and a static random-access memory (SRAM). Each data storage unit may include multiple physical storage spaces.

Generally, the to-be-processed data or the intermediate data sent to the processor 211 may include a corresponding address. The processor may determine a target first identifier according to the address in the to-be-processed data or the intermediate data by using a first preset hash function, and access a target first data storage section 213 indicated by the target first identifier via the first bus in the processor circuit 21.

In some optional implementations of this embodiment, the processor circuit 21 may include multiple processors 211.

In these optional implementations, the multiple processors 211 in the processor circuit 21 may operate cooperatively via the first bus. Each processor 211 may access different first data storage sections based on respective first identifiers of these first data storage sections. Each of the first data storage sections 213 may cache data of the processor 211. In some application scenarios, each processor 211 may access these first data storage sections through a first network on chip (NoC) arranged in the processor circuit.

In some optional implementations, the multiple first data input/output interfaces 212 each correspond to a second identifier. The second identifier may include a number and a character. Optionally, the second identifier of a first data input/output interface 212 may be the same as the first identifier of the first data storage section 213 corresponding to the first data input/output interface 212. The multiple second data input/output interfaces 222 each correspond to a third identifier. The third identifier may include a number and a character. The second identifier corresponding to the first data input/output interface 212 and the third identifier corresponding to the second data input/output interface 222 may be mapped to the first identifier corresponding to the first data storage section corresponding to the first data input/output interface 212 based on a preset mapping relationship.

In these optional implementations, the accelerator circuit 22 further includes an address determination unit 223. The address determining unit 223 is configured to determine a target first identifier corresponding to the first data storage section based on the address of the to-be-processed data, and determine a target first data input/output interface 212 and a target second data input/output interface 222 based on the target first identifier. For example, a target second identifier corresponding to the target first data input/output interface 212 that corresponds to the target first identifier and a target third identifier corresponding to the target second data input/output interface 222 are determined based on the target first identifier. Further, based on the target first data input/output interface 212 and the target second data input/output interface 222 and the connection between the target first data input/output interface 212 and the target second data input/output interface 222, the accelerator 221 performs data interaction with the target first data storage section corresponding to the target first identifier.

In some application scenarios, the address determination unit 223 may be provided with a second preset hash function. The address determining unit 223 may calculate the target first identifier based on the address in the to-be-processed data by using the second preset hash function.

In an optional implementation, a length of a target path for accessing the target first data storage section through the target first data input/output interface 212 and the target second data input/output interface 222 is shorter than a length of a target path for accessing the target first data storage section through a first data input/output interface rather than the target first data input/output interface and a second data input/output interface rather than the second data input/output interface.

The length of the path may include the first data input/output interface 212, the second data input/output interface 222, and a data channel inside the processor circuit.

In an illustration, a path to the target data storage section Z includes: a path of (1) from the first data input/output interface a to the second data input/output interface a'; and a path of (2) from the first data input/output interface b to the second data input/output interface b' and then to the data channel d inside the processor circuit. The path of (1) is shorter than the path of (2).

The path of (1) from the first data input/output interface a to the second data input/output interface a' may be determined as the target path. The first data input/output interface a is determined as the target first data input/output interface, and the second data input/output interface a' is determined as the target second data input/output interface.

In these application scenarios, the accelerator 221 accesses the target first data storage section through a path with a smallest length, for data access, reducing the nodes for data transmission. On the one hand, the speed of data interaction between the accelerator and the target first data storage section can be improved. On the other hand, the problem of channel congestion caused by the data channel in the processor circuit resulted from that multiple nodes in the processor circuit are involved when the accelerator accesses the first data storage section in the processor circuit can be avoided.

In some other application scenarios, a time period spent by the accelerator 221 to access the target first data storage section through the target first data input/output interface and the target second data input/output interface is shorter than a time period spent by the accelerator 221 to access the target first data storage section through a first data input/output interface rather than the target first data input/output interface and a second data input/output interface rather than the second data input/output interface.

In these application scenarios, in a case that a path between an original first data input/output interface and an original second data input/output interface for data interaction between the accelerator 221 and the target first data storage section is congested, the address determination unit 223 determines the target first data input/output interface and the target second data input/output interface, so that the path between the target first data input/output interface and the target second data input/output interface bypass the congested path. Therefore, the data interaction between the accelerator and the target first data storage section is performed smoothly.

In some optional implementations, the accelerator circuit 22 may include a second cache section and multiple accelerators 221. The multiple accelerators each are connected to the second cache section via a second bus. In this way, each accelerator can access the second cache section via the second bus, so as to perform data interaction with the second cache section.

The multiple accelerators 221 each are connected to the multiple second data input/output interfaces 222 via the second bus.

A topology of the second bus includes one of: a ring topology, a mesh topology, and a star topology.

The second bus includes: a cache coherent bus or a non-cache coherent bus.

Further, the accelerator circuit 22 may include multiple accelerators 221. The multiple accelerators 221 accelerators each are connected to the multiple second data input/output interfaces through a data channel of a second network on chip arranged in the accelerator circuit.

The multiple accelerators 221 herein may implement the same type of data processing, or may implement respective types of data processing.

Compared with the embodiment shown in FIG. 1, in the integrated circuit according to this embodiment, the multiple first data storage sections and the multiple first data input/output interfaces are arranged in the processor circuit. The multiple second data input/output interfaces are arranged in the accelerator circuit. In order to access a first data storage section, the accelerator determines an optimal transmission path, and then exchanges information with the first data storage section through the optimal transmission path. This embodiment is applicable to a scenario of multiple first data storage sections and/or multiple processors. In addition, the accelerator circuit is connected to the processor circuit through multiple first data input/output interfaces, which can avoid a problem in the quality of service caused by the large occupation of processor circuit resources due to channel congestion caused by being connected to the processor circuit through one first data input/output interface.

In some optional implementations of the integrated circuit according to the present disclosure, the processor circuit and the accelerator circuit in the integrated circuit shown in FIG. 1 as well as the processor circuit and the accelerator circuit in the integrated circuit according to the embodiment shown in FIG. 2 may be packaged in the same package using a preset package method.

Figure 3:
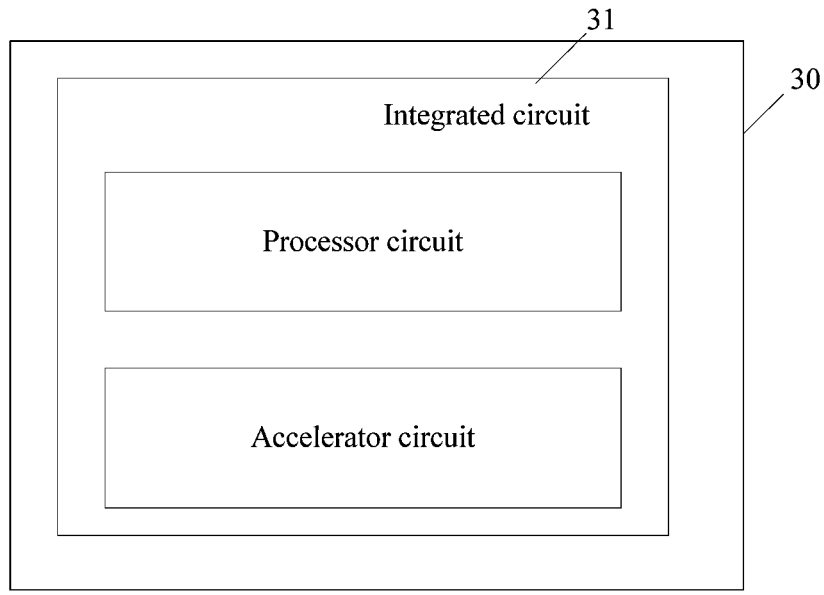
FIG. 3 is a schematic structural diagram illustrating a data processing device according to some embodiments of the present disclosure.

Reference is made to FIG. 3, which is a schematic structural diagram illustrating a data processing device according to some embodiments of the present disclosure. As shown in FIG. 3, the data processing device 30 includes an integrated circuit 31. The integrated circuit 31 includes a processor circuit and an accelerator circuit. The processor circuit includes a processor, a first data storage section, and a first data input/output interface. The accelerator circuit includes an accelerator and a second data input/output interface. The second data input/output interface is electrically connected to the first data input/output interface, so that the accelerator circuit performs information interaction with the first data storage section.

Figure 4:
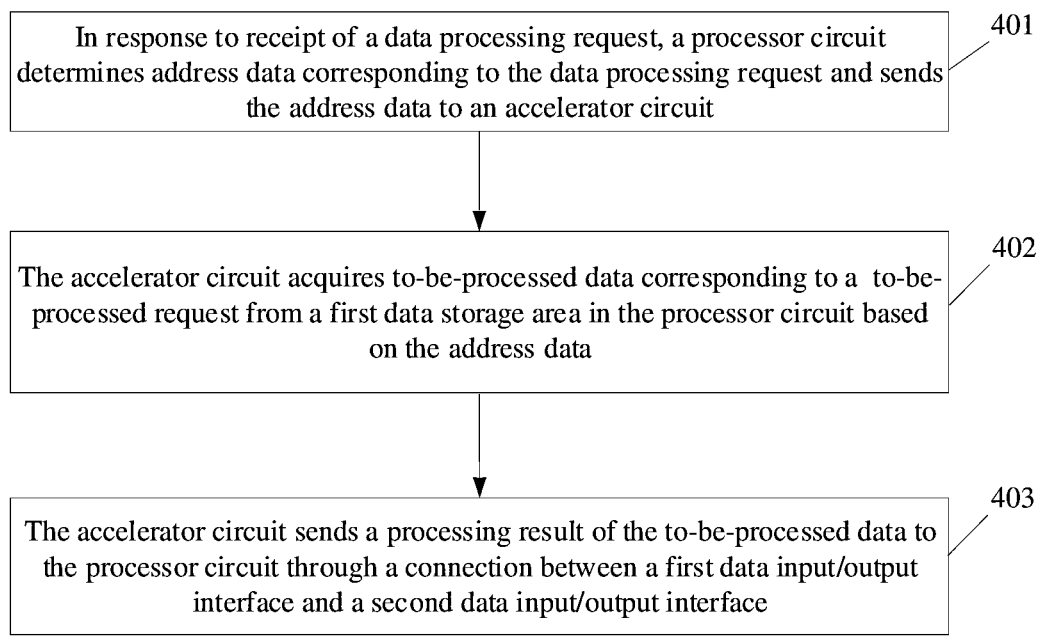
FIG. 4 is a schematic flowchart illustrating a data processing method according to the present disclosure.

Reference is made to FIG. 4, which is a schematic flowchart illustrating a data processing method according to the present disclosure. The data processing method is applied to the integrated circuit shown in FIG. 1. As shown in FIG. 4, the data processing method includes the following steps 401 to 403.

In step 401, in response to receipt of a data processing request, a processor circuit determines address data corresponding to the data processing request and sends the address data to an accelerator circuit.

The integrated circuit includes the processor circuit and the accelerator circuit. The processor circuit includes a processor, a first data storage section, and a first data input/output interface. The processor is connected to the first data storage section via a first bus arranged in the processor circuit. The accelerator circuit includes an accelerator, a second data input/output interface. The accelerator is connected to the second data input/output interface via a second bus.

The first data input/output interface is electrically connected to the second data input/output interface.

On receipt of the data processing request, the processor circuit sends the address data to the accelerator circuit through the first data input/output interface and the second data input/output interface that are connected.

In step 402, the accelerator circuit acquires to-be-processed data corresponding to a to-be-processed request from the first data storage section in the processor circuit based on the address data.

Specifically, the accelerator circuit may acquire the to-be-processed data from the first data storage section through the first data input/output interface and the second data input/output interface.

In some application scenarios, the processor circuit includes multiple first data storage sections and multiple first data input/output interfaces. The multiple first data storage sections are in one-to-one correspondence with the multiple first data input/output interfaces. The accelerator circuit includes multiple second data input/output interfaces, and the multiple first data input/output interfaces are in one-to-one correspondence with the multiple second data input/output interfaces. A second data input/output interface is electrically connected to its corresponding first data input/output interface.

The first data storage section corresponds to a first identifier. The first data input/output interface corresponds to a second identifier. The second data input/output interface corresponds to a third identifier.

In these application scenarios, the accelerator circuit further includes an address determination unit. The address determining unit determines a target first identifier based on an address in the received to-be-processed data by using a preset hash function, determines a target first data storage section based on the target first identifier, determines a target second identifier and a target third identifier each corresponding to the target first data storage section, and then determines the target first data input/output interface based on the target second identifier and determines the target second data input/output interface based on the target third identifier. The accelerator performs data interaction with the target first data storage section corresponding to the target first address through the target second data input/output interface and the target first data input/output interface.

A length of a target path for the accelerator to access the target first data storage section through the target first data input/output interface and the target second data input/output interface is shorter than a path for the accelerator to access the target first data storage section through a first data input/output interface rather than the target first data input/output interface and a second data input/output interface rather than the second data input/output interface.

The time period spent by the accelerator to access the target first data storage section through the target first data input/output interface and the target second data input/output interface is shorter than a time period spent by the accelerator 221 to access the target first data storage section through a first data input/output interface rather than the target first data input/output interface and a second data input/output interface rather than the second data input/output interface.

In step 403, the accelerator circuit sends a processing result of the to-be-processed data to the processor circuit through the connection between the first data input/output interface and the second data input/output interface.

In the data processing method provided by the embodiment, in response to receiving a data processing request, a processor circuit determines address data corresponding to the data processing request; the address data is sent to an accelerator circuit outside the processor circuit, the accelerator circuit carries out data interaction with the processor circuit through a second data input/output interface of the accelerator circuit and a first data input/output interface of the processor circuit, on one hand, the accelerator accesses the first data storage area of the processor circuit without being limited by a bus in the processor core, on the other hand, when the accelerator accesses the first data storage area, the accelerator does not influence the processor excessively, the congestion phenomenon on the processor bus can be reduced, and the quality of service (QoS) of application can be improved Only preferred embodiments of the present disclosure and an illustration of the technical principles employed are described above. Those skilled in the art should understand that the scope of disclosure involved in the present disclosure is not limited to the technical solutions formed by a certain combination of the above technical features, and should also cover other technical solutions formed by any combination of the above technical features or their equivalents without departing from the above disclosed concept, for example, a technical solution formed by replacing the above features with technical features (but not limited to) having similar functions disclosed in the present disclosure.

Additionally, operations are described in a particular order, which should not be construed as that these operations should be performed in the particular order shown or in a sequential order. Under certain circumstances, multitasking and parallel processing may be advantageous. Likewise, the above discussion contains several implementation-specific details, these should not be construed as limitations on the scope of the present disclosure. Certain features that are described in the context of separate embodiments may be implemented in combination in a single embodiment. Alternatively, various features that are described in the context of a single embodiment may be implemented separately or in any suitable sub-combination in multiple embodiments.

Although the subject matter has been described in language specific to structural features and/or logical operations of method, it should be understood that the subject matter defined in the appended claims is not necessarily limited to the specific features or operations described above. Instead, the features and operations described above are merely example forms of implementing the claims.

The invention claimed is:

1. An integrated circuit, comprising:
a processor circuit comprising a processor, a first data storage section, and a first data input/output interface; and
an accelerator circuit comprising an accelerator and a second data input/output interface, wherein the second data input/output interface is electrically connected to the first data input/output interface so that the accelerator circuit performs information interaction with the first data storage section;
wherein the processor circuit comprises a plurality of first data storage sections and a plurality of first data input/output interfaces, and the plurality of first data storage sections are in one-to-one correspondence with the plurality of first data input/output interfaces;
the accelerator circuit includes a plurality of second data input/output interfaces, and the plurality of first data input/output interfaces are in one-to-one correspondence with the plurality of second data input/output interfaces; and
each of the plurality of second data input/output interfaces is electrically connected to the first data input/output interface corresponding to the second data input/output interface.

2. The integrated circuit according to claim 1, wherein a path through which the second data input/output interface is electrically connected to the first data input/output interface comprises:
a serial communication module; or
a parallel communication module.

3. The integrated circuit according to claim 1, wherein the processor circuit comprises a plurality of processors, and the plurality of processors are respectively connected to the plurality of first data storage sections via a first bus.

4. The integrated circuit according to claim 1, wherein the plurality of first data storage sections each correspond to a first identifier, and the accelerator circuit further comprises an address determination unit, wherein
the address determination unit is configured to determine a target first identifier based on an address in to-be-processed data, and determine a target first data input/output interface and a target second data input/output interface based on the target first identifier, wherein the accelerator performs data interaction with a target first data storage section corresponding to the target first address through the target second data input/output interface and the target first data input/output interface.

5. The integrated circuit according to claim 4, wherein a length of a target path for the accelerator to access the target first data storage section through the target first data input/output interface and the target second data input/output interface is shorter than a length of a path for the accelerator to access the target first data storage section through a first data input/output interface rather than the target first data input/output interface and a second data input/output interface rather than the second data input/output interface.

6. The integrated circuit according to claim 4, wherein a time period spent by the accelerator to access the target first data storage section through the target first data input/output interface and the target second data input/output interface is shorter than a time period spent by the accelerator to access the target first data storage section through a first data input/output interface rather than the target first data input/output interface and a second data input/output interface rather than the second data input/output interface.

7. The integrated circuit according to claim 6, wherein the accelerator circuit comprises a second cache section and a plurality of accelerators, and the plurality of accelerators each are connected to the second cache section and each of the plurality of second data input/output interfaces via a second bus.

8. The integrated circuit according to claim 7, wherein a topology of the second bus comprises one of: a ring topology, a mesh topology, and a star topology.

9. The integrated circuit according to claim 7, wherein the second bus comprises: a cache coherent bus or a non-cache coherent bus.

10. The integrated circuit according to claim 1, wherein the processor circuit and the accelerator circuit are in a same package.

11. A data processing device comprising: an integrated circuit, wherein
the integrated circuit comprises a processor circuit and an accelerator circuit; the processor circuit comprises a processor, a first data storage section, and a first data input/output interface; and the accelerator circuit comprises an accelerator and a second data input/output interface, wherein the second data input/output interface is electrically connected to the first data input/output interface so that the accelerator circuit performs information interaction with the first data storage section;
wherein the processor circuit comprises a plurality of first data storage sections and a plurality of first data input/output interfaces, and the plurality of first data storage sections are in one-to-one correspondence with the plurality of first data input/output interfaces;
the accelerator circuit includes a plurality of second data input/output interfaces, and the plurality of first data input/output interfaces are in one-to-one correspondence with the plurality of second data input/output interfaces; and
each of the plurality of second data input/output interfaces is electrically connected to the first data input/output interface corresponding to the second data input/output interface.

12. The data processing device according to claim 11, wherein the processor circuit comprises a plurality of processors, and the plurality of processors are respectively connected to the plurality of first data storage sections via a first bus.

13. The data processing device according to claim 11, wherein the plurality of first data storage sections each correspond to a first identifier, and the accelerator circuit further comprises an address determination unit, wherein
the address determination unit is configured to determine a target first identifier based on an address in to-be-processed data, and determine a target first data input/output interface and a target second data input/output interface based on the target first identifier, wherein the accelerator performs data interaction with a target first data storage section corresponding to the target first address through the target second data input/output interface and the target first data input/output interface.

14. The data processing device according to claim 13, wherein a length of a target path for the accelerator to access the target first data storage section through the target first data input/output interface and the target second data input/output interface is shorter than a length of a path for the accelerator to access the target first data storage section through a first data input/output interface rather than the target first data input/output interface and a second data input/output interface rather than the second data input/output interface.

15. The data processing device according to claim 13, wherein a time period spent by the accelerator to access the target first data storage section through the target first data input/output interface and the target second data input/output interface is shorter than a time period spent by the accelerator to access the target first data storage section through a first data input/output interface rather than the target first data input/output interface and a second data input/output interface rather than the second data input/output interface.

16. The data processing device according to claim 15, wherein the accelerator circuit comprises a second cache section and a plurality of accelerators, and the plurality of accelerators each are connected to the second cache section and each of the plurality of second data input/output interfaces via a second bus.

17. The data processing device according to claim 16, wherein the second bus comprises: a cache coherent bus or a non-cache coherent bus.

18. A data processing method, applied to an integrated circuit, the integrated circuit comprises a processor circuit comprising a processor, a first data storage section, and a first data input/output interface; and an accelerator circuit comprising an accelerator and a second data input/output interface, wherein the second data input/output interface is electrically connected to the first data input/output interface, wherein the processor circuit comprises a plurality of first data storage sections and a plurality of first data input/output interfaces, and the plurality of first data storage sections are in one-to-one correspondence with the plurality of first data input/output interfaces, the accelerator circuit includes a plurality of second data input/output interfaces, and the plurality of first data input/output interfaces are in one-to-one correspondence with the plurality of second data input/output interfaces; and each of the plurality of second data input/output interfaces is electrically connected to the first data input/output interface corresponding to the second data input/output interface, wherein the method comprises:
determining, by the processor circuit in response to receipt of a data processing request, address data corresponding to the data processing request, and sending, by the processor circuit in response to receipt of the data processing request, the address data to the accelerator circuit;
acquiring, by the accelerator circuit based on the address data, to-be-processed data corresponding to a to-be-processed request from the first data storage section in the processor circuit; and
sending, by the accelerator circuit, a processing result of the to-be-processed data to the processor circuit through a connection between the first data input/output interface and the second data input/output interface.

* * * * *